Dec. 23, 1952 — E. P. TURNER — 2,622,706
HANDLE WITH CORD CONTROL MECHANISM
Filed March 9, 1949
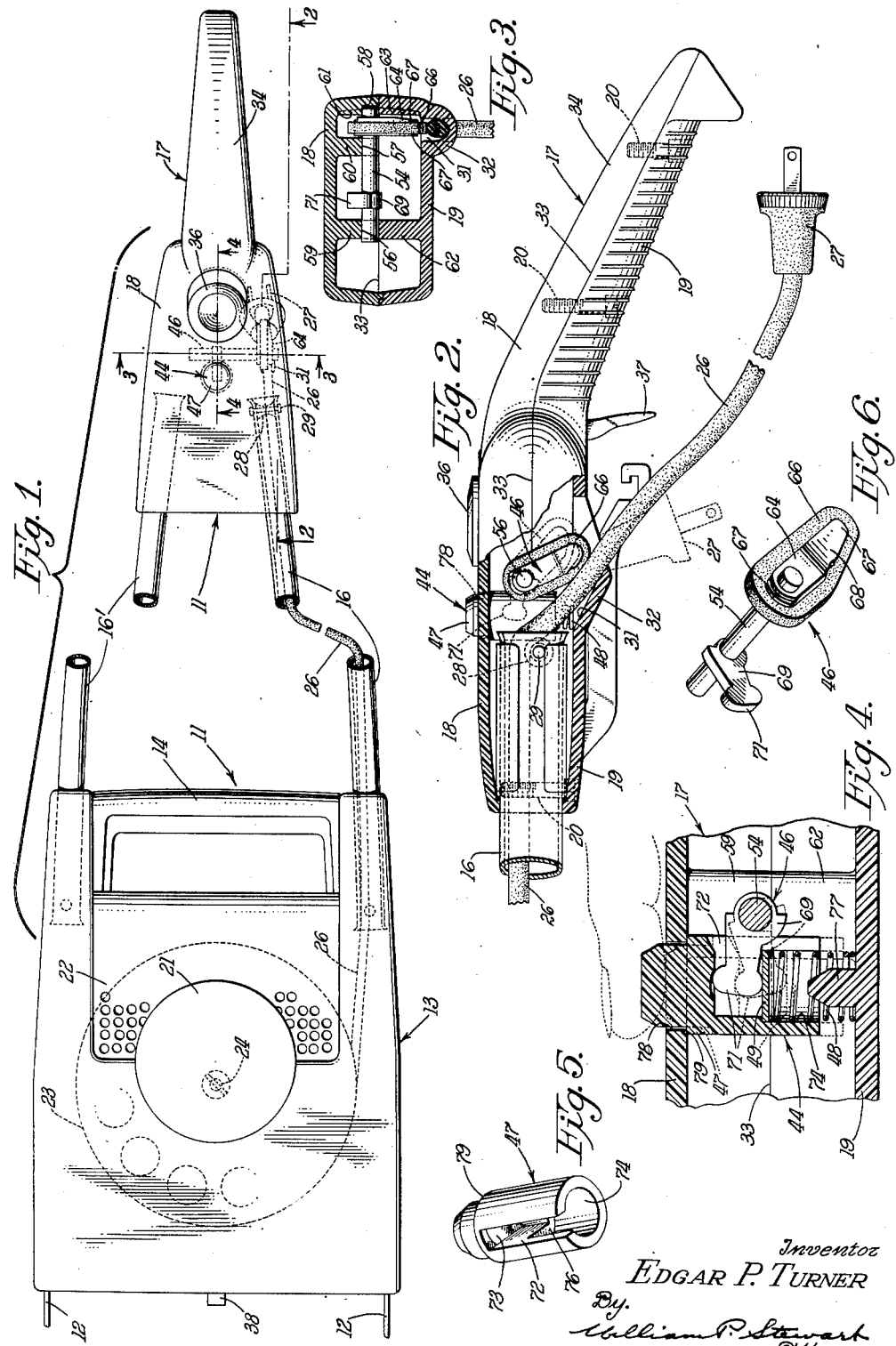
Inventor
EDGAR P. TURNER
By William P. Stewart
Attorney Patented Dec. 23, 1952

2,622,706

UNITED STATES PATENT OFFICE 2,622,706

HANDLE WITH CORD CONTROL MECHANISM

Edgar P. Turner, Fanwood, N. J., assignor to The Singer Manufacturing Company, Elizabeth, N. J., a corporation of New Jersey Application March 9, 1949, Serial No. 80,361

7 Claims. (Cl. 188—65.1)

This invention relates to vacuum cleaner handles having a spring biased take-up reel for retention of an electric extension cord, and more particularly to a cord control mechanism whereby the extension cord may be pulled from the reel, held at any desired extended position, or allowed to be retrieved by the reel.

The primary object of my present invention is the provision of an improved device of this character which will be inexpensive to manufacture, compact in construction, and reliable in operation.

Other important objects of my invention will be apparent from the following specification and claims.

For a complete understanding of my invention reference should be made to the drawings which form a part of this specification and in which:

Fig. 1 is a plan view of a vacuum cleaner handle equipped with my improved cord control mechanism, the handle being shown as shortened by omitting a middle portion thereof;

Fig. 2 is an enlarged side elevational view of the upper end of the handle shown in Fig. 1, parts being cut away to illustrate internal construction;

Fig. 3 is an enlarged sectional view taken on the line 3—3 of Fig. 1;

Fig. 4 is an enlarged sectional view taken on the line 4—4 of Fig. 1, dotted lines showing the depressed position of the push button; and Figs. 5 and 6 are perspective views of certain individual parts of the cord control mechanism.

A more detailed disclosure of the overall features of the vacuum cleaner handle shown in the accompanying single sheet of drawings will be found in patent application Serial No. 781,836, filed October 24, 1947, in patent application Serial No. 1,386, filed January 9, 1948, and in U. S. design patent No. Des. 152,182, issued December 28, 1948.

The vacuum cleaner handle 11 illustrated in the accompanying drawings is pivotally attached to a vacuum cleaner casing (not shown) by means of a pair of flat metallic arms 12—12. The vacuum cleaner handle is constructed from a plurality of parts, including, a comparatively wide cord-reel housing 13 a transversely extending pick-up handle 14, a pair of convergent-divergent handle arms or tubes 16—16', and a hand grip portion 17, the latter being formed of plastic. The hand grip 17 is constructed from an upper shell 18 and a lower shell 19 held together by screws as 20. Both shells 18 and 19 are recessed to form a cavity therebetween.

The reel housing 13 carries a decorative medallion 21 and a screen 22 on its outer face and houses a cord take-up reel 23. The lower or divergent terminals of the hollow handle tubes 16 and 16' are partly embedded in rearwardly extending portions of the reel housing 13. The rearward or convergent terminals of the handle tubes 16 and 16' enter and are secured between the upper and lower shells 18 and 19 of the comparatively narrow hand grip 17.

The cord reel 23, which may be any one of several known spring biased cord reels, is rotatably supported in the reel case 13 on a fixed axle 24, and a two conductor electric extension cord 26, round in cross section, is pulled from and retrieved by the reel 23 as necessity dictates, the free end of the cord 26 being provided with the usual electric plug 27 which is suitable for energizing the vacuum cleaner from a conventional electrical receptacle. As the cord 26 leaves the reel 23 it enters the forward or lower terminal of the hollow handle tube 16, passes through the tube to the upper end thereof, where a guiding sheave or grooved roller 28 is supported inside the handle tube 16 on an axle 29. The axle 29 and thus the sheave 28 extends crosswise of the handle grip 17. The cord 26, just before it leaves the tube 16, passes over the top of the sheave 28 and then enters the cavity provided between the two handle grip shells 18 and 19. Thereafter the cord 26 exits from the hand grip through a U-shaped aperture or cord-exit opening 31 provided in the lower shell 19. The aperture 31 is formed in a wall, which may be termed an anvil 32. This wall is U-shaped in cross section and of a size to advantageously receive the cord 26. The cord 26 as it passes through the aperture 31 is positioned so as to lie parallel to the bottom of the U-shaped channel 31.

As stated above, the hand grip 17 comprises an upper shell 18 and a lower shell 19, and these shells join on a surface indicated by the numeral 33. Fig. 1 shows that the main portion of the hand grip 17 is substantially in the form of an isosceles trapezoid, the non-parallel sides of which are substantially parallel to the convergent handle tubes 16 and 16'. A grip-portion 34 extends rearwardly and downwardly from the shorter parallel side of the isosceles trapezoidal portion of the hand-grip 17. The hand-grip 17 houses and supports a plurality of control elements including an electric switch 36, a trigger 37 for operating a handle positioning latch 38, and a cord control mechanism indicated generally by the numeral 44.

The cord control mechanism 44 is constructed from separate elements cooperating with portions of the upper and lower hand-grip shells; the elements being a dog member 46, a push button cup 47, a helical compression biasing spring 48, and a disc 49. The dog member 46, which is best shown in Figs. 3 and 6, has a cylindrical rock-shaft 54 journaled in bearing notches 56, 57 and 58. Notches 56 and 57 are formed in the lower ends of depending bosses 59 and 60 respectively and notch 58 is formed in a boss 61 that is integral with the side wall portion of the upper handle shell 18. The lower shell 19 is provided with a pair of upwardly extending bosses 62 and 63 which engage the lower ends of the bosses 59 and 61 respectively and thus effectively close the bearing notches to journal the shaft 54.

The dog member shaft 54 has a presser or brake arm 64 secured adjacent one of its ends, and the arm 64 is surrounded or tired with a rubber washer 66, preferably of rectangular cross section. In order to hold the rubber tire 66 in place, both ends of the arm 64 are provided with flanges 67—67. The free end of the arm 64 is slabbed as at 68 for a reason later to be set forth. Toward the other end of the shaft 54, the dog member 46 is provided with an operating lever 69, having at its free end a knob 71. Reference to Fig. 6 shows that the arm 64 and the arm 69 are spaced approximately one hundred and fifteen degrees (115°) apart around the axis of the shaft 54.

The push button cup 47 which is generally cylindrical in form, is preferably made of plastic and is provided with a longitudinally extending slot 72 that is arranged to receive the arm 69. The upper end of this slot 72 is concave as at 73 and engages the upper edge of the rounded portion of the knob 71. The lower portion of the button 47 is provided with a concentric hole 74, bounded at the top by an upper wall 76, and surrounded, except where it connects with the slot 72, by a cylindrical wall formed integral with the button. The disc 49 is positioned in the hole 74 and is pressed upwardly against the wall 76 by the spring 48 of which the upper end also enters the hole 74. When the parts are assembled, the lower portion of the knob 71 is engaged by the upper surface of the disc 49. The lower end of the spring 48 which protrudes from the hole 74 encircles a post 77 rising from the inside surface of the lower shell 19 and, when the two shells 18 and 19 are in assembled relation, the post 77 is located directly below and concentric with an orifice 78 formed in the upper casing shell 18. The upper end portion of the button 47 is of reduced cross section and thereby forms a shoulder 79 which engages the inner surface of the upper shell where the reduced portion of the button 47 passes through the orifice 78, thus limiting the outward movement of the button 47.

If it is assumed that the cord take-up reel 23 has fully retrieved the electric cord 26, the electric plug 27 will be at the position shown by the dotted lines in Fig. 2, and when no pressure is applied to the button 47 (solid lines of Fig. 4), the spring 48 will press the disc 49, the button 47 and the arm 69—71 upwardly. This tends to cause a clockwise rotation (Figs. 2 and 4) of the shaft 54, whereby the slabbed side 68 of the presser arm 64 presses the rubber tire 66 against the top surface of the extension cord 26, thereby clamping the cord 26 against the anvil 32.

When it is desired to extend the cord 26, the plug 27 is simply pulled until enough cord has been unwound from the reel 23. The tired arm 64 does not impede movement of the cord 26 out of the handle. While the take-up reel 23 tends to retrieve the cord 26, the position of the arm 64, the slabbed surface 68 and the tire 66, with respect to the anvil 32, causes the arm 64 to act as a toggle that prevents the cord 26 from being retrieved by the reel 23. The holding of the cord 26 by the toggle arm 64 is particularly effective because of the high coefficient of friction that results from contact of the rubber tire 66 with the rubber cord 26. In this connection, it should be noted that the rubber cord 26 is not damaged by the rubber tire 66. Should it be desired to allow the take-up reel 23 to retrieve the cord, it is simply necessary to depress the button 47, against the pressure of the spring 48, which lowers the arm 69 and causes the shaft 54 to move in a counterclockwise direction, thus raising the presser arm 64 and its tire 66 away from the cord 26 and the anvil 32.

Having thus set forth the nature of the invention, what I claim herein is:

1. A vacuum cleaner handle having a hand-grip comprising, an upper shell and a lower shell clamped together to form a cavity therebetween; a rock-shaft pivotally supported in said cavity; an operating lever and a presser-arm carried by said shaft; an anvil slot formed in one of said shells; an extension cord movable in said anvil slot and engaged by said presser-arm; a push-button located adjacent to said operating lever and having a hole and a slot, said slot being entered by said operating lever; and a compression spring entering said hole in said push-button, one end of said spring engaging one of said shells, and the other end of said spring biasing said lever to pivot said rock-shaft and thereby force said presser-arm to clamp said cord against said anvil slot.

2. In a vacuum cleaner handle hand-grip; an upper shell and a lower shell clamped together to form a cavity therebetween, said upper shell having an orifice and said lower shell having a post concentric with said orifice; a plurality of complemental bosses formed integral with said upper and lower shells, some of said bosses being notched; a rock-shaft pivotally supported in said cavity by said bosses; an operating lever and a presser-arm carried by said rock-shaft; an anvil slot formed in said lower shell; an extension cord movable in said anvil slot and engaged by said presser-arm; a push-button located adjacent to said operating lever and having a reduced end extending through the orifice in said upper shell, said push-button having a hole and a slot, the latter receiving the end of said operating lever; and a spring surrounding said post and entering the hole in said push-button for biasing said lever in a direction to effect clamping of said cord by said presser-arm.

3. In a vacuum cleaner handle hand-grip; an upper plastic shell and a lower plastic shell clamped together to form a cavity therebetween, said upper shell having an orifice and said lower shell having a post concentric with said orifice; a rock-shaft supported in said cavity by said upper and lower shells; an operating lever carried by said shaft and perpendicular thereto; a presser arm also carried by and perpendicular to said shaft and spaced circumferentially around the axis of said shaft from said operating lever; a rubber tire surrounding the periphery of said presser arm; a U-shaped anvil formed integral with said lower shell; an extension cord movable past said U-shaped anvil and engaged by said tire on said presser arm; a cup-shaped plastic push-button having a reduced end extending through the orifice in said upper shell, said push-button having a cylindrical hole and a slot, the latter for receiving the end of said operating lever; a disc disposed in said hole in engagement with said operating lever; and a compression spring surrounding said post, entering said hole in said push-button, and engaging said disc.

4. A vacuum cleaner handle having a handgrip comprising opposed shells providing a cavity therebetween, one of said shells having a wall terminating in a cord-exit opening and one of said shells also having a plurality of first bosses, an extension cord movable past said wall and through said opening, a push-button disposed in said cavity and having one end extending through one of said shells, said push-button being lengthwise provided with a slot and having its opposite end provided with an axial opening connected with said slot, a plurality of notched bosses formed on one of said shells complemental to said first bosses, a two-armed operating lever pivotally mounted by said bosses in said cavity, one arm of said lever entering the push-button slot and the other arm being opposed to said wall in engagement with said cord, and an operating-lever biasing spring housed in the opening of said push-button.

5. In a vacuum cleaner handle grip; two plastic shells clamped together to form a cavity therebetween, one of said shells having a plurality of bosses and an orifice and the other of said shells having a plurality of bosses complemental to said first bosses and a post concentric with said orifice; a rock-shaft supported in said cavity by said bosses; an operating lever carried by one end of said rock-shaft; a presser-arm carried by the other end of said rock-shaft; a braking member carried by said presser-arm; an anvil slot formed in one of said shells and located adjacent to said presser-arm; an extension cord movable in said anvil slot and engaged by said braking member; a cylindrical push-button located adjacent to said operating lever and having a reduced end extending through said orifice, the other end of said push-button having a concentric hole and a slot extending lengthwise thereof and communicating with said concentric hole, said slot being adapted to receive said operating lever; and a compression spring surrounding said post, entering said concentric hole in said push-button, and engaging and thereby biasing said operating lever.

6. A vacuum cleaner hand-grip, comprising; an upper shell having an orifice and a plurality of integrally formed notched bosses; a lower shell having a post and a plurality of integrally formed bosses, the upper and lower shells being clamped together to form a cavity therebetween and to position said orifice concentric with said post and said bosses on said upper shell complemental to said bosses on said lower shell; a cylindrical rock-shaft pivotally supported in said cavity by said complemental bosses; an operating lever and a presser-arm formed integral with said shaft and axially spaced therealong, said lever and presser-arm also being circumferentially spaced around said shaft; a rubber braking member carried by said presser-arm; an anvil slot formed in one of said shells and located to cooperate with said rubber braking member and said presser-arm; an extension cord movable in said anvil slot and engaged by said rubber member; a cylindrical push-button located adjacent to said operating lever and having a reduced end entering said orifice and also having a concentric hole and a slot, said slot and said hole being entered by said operating lever; and a compression spring entering said hole in said push-button and engaging said post, spring biasing said lever to force said rubber braking member carried by said presser-arm to clamp said cord in said anvil slot and to bias said push-button into said orifice and against said upper shell.

7. In a vacuum cleaner handle grip; two plastic shells clamped together to form a cavity therebetween, one of the shells having an orifice and the other of said shells having a post concentric with said orifice; a rock-shaft supported in said cavity by said shells; an operating lever carried by said shaft; a presser arm also carried by said shaft; a braking means carried by said presser arm; an anvil slot formed in one of said shells; an extension cord movable in said anvil slot and engaged by said braking means; a push-button extending through the orifice in one of said shells, said push-button having a means for engaging said operating lever; and a compression spring engaging said post, and biasing said push-button and operating lever.

EDGAR P. TURNER.

REFERENCES CITED

The following references are of record in the file of this patent:

UNITED STATES PATENTS

| Number | Name | Date |
|---|---|---|
| 822,058 | Kurella | May 29, 1906 |
| 1,887,173 | Famarin | Nov. 8, 1932 |
| 1,936,463 | Strang | Nov. 21, 1933 |
| 2,016,935 | Strang et al. | Oct. 8, 1935 |
| 2,161,461 | Doherty | June 6, 1939 |
| 2,187,361 | Palsson | Jan. 16, 1940 |